US012796675B2

(12) United States Patent
Brooks et al.

(10) Patent No.: US 12,796,675 B2
(45) Date of Patent: Nov. 17, 2026

(54) AGRICULTURAL SPRAYER WITH AUXILIARY OPERATION CONTROL

(71) Applicant: CNH Industrial America LLC, New Holland, PA (US)

(72) Inventors: Nathan Paul Brooks, Manitowoc, WI (US); Andrew Jacobson, Manitowoc, WI (US); Steven Winkel, Elkhart Lake, WI (US)

(73) Assignee: CNH Industrial America LLC, New Holland, PA (US)

( * ) Notice: Subject to any disclaimer, the term of this patent is extended or adjusted under 35 U.S.C. 154(b) by 506 days.

(21) Appl. No.: 17/973,732

(22) Filed: Oct. 26, 2022

(65) Prior Publication Data

US 2024/0138394 A1 May 2, 2024

(51) Int. Cl.
*A01M 7/00* (2006.01)
*B05B 1/20* (2006.01)

(52) U.S. Cl.
CPC ........ *A01M 7/0089* (2013.01); *A01M 7/0075* (2013.01); *B05B 1/205* (2013.01)

(58) Field of Classification Search
CPC .............. A01M 7/0089; A01M 7/0075; A01M 7/0042; B05B 1/205
(Continued)

(56) References Cited

U.S. PATENT DOCUMENTS 4,723,709 A * 2/1988 Curran, Jr. .............. B05B 15/20 239/110
5,310,113 A * 5/1994 Cowgur .............. B05B 12/1418 239/69

(Continued)

FOREIGN PATENT DOCUMENTS

CN 208010390 U 10/2018
CN 214902111 U 11/2021
DE 102015101032 A1 * 7/2016 ............. A01C 23/00

OTHER PUBLICATIONS

"Control Handle in John Deere R4038 Sprayer" Leading Edge Equipment March 19, 2021 (1 page) https://www.youtube.com/watch?v=2QzG-iNLrsE.

(Continued)

*Primary Examiner* — Steven M Cernoch
*Assistant Examiner* — Anna Thi Ho
(74) *Attorney, Agent, or Firm* — Dority & Manning, P.A.

(57) ABSTRACT

An agricultural sprayer includes a hydrostatic drive system configured to rotationally drive at least some of the plurality of wheels, with the hydrostatic drive system including a hydrostatic pump. Furthermore, the sprayer includes an agricultural fluid supply system configured to supply agricultural fluid to nozzles on the sprayer, with the agricultural fluid supply system including a supply pump and a plurality of supply valves. Additionally, the sprayer includes an operator input device configured to receive to an input indicative of halting auxiliary operation of the agricultural sprayer. As such, a computing system is configured to receive the input from the operator input device. Moreover, upon receipt of the input, the computing system is configured to control an operation of the hydrostatic drive system and the agricultural fluid supply system such that the supply pump is halted, the plurality of supply valves is closed, and the hydrostatic pump is operating.

7 Claims, 6 Drawing Sheets

(58) Field of Classification Search
USPC .......................................................... 239/163
See application file for complete search history.

(56) References Cited

U.S. PATENT DOCUMENTS 5,833,144 A * 11/1998 Kinter ................ A01M 7/0089 239/600
5,911,362 A * 6/1999 Wood .................. A01M 7/0089 239/161
5,988,528 A * 11/1999 Krohn ................ A01M 7/0075 239/168
5,992,759 A * 11/1999 Patterson ............ A01M 7/0075 239/168
6,145,455 A * 11/2000 Gust .................. A01M 9/0092 111/178
6,189,807 B1 * 2/2001 Miller .................... B05B 12/04 137/625.22
6,678,580 B2 * 1/2004 Benneweis .......... A01B 79/005 700/240
6,776,355 B2 8/2004 Ringer et al.
7,823,803 B2 * 11/2010 Peterson .............. A01C 23/008 91/169
8,028,927 B2 10/2011 Ward et al.
8,191,795 B2 * 6/2012 Grimm ............... A01M 7/0089 239/69
9,435,458 B2 * 9/2016 Needham ............ F16K 31/0658
9,445,540 B2 * 9/2016 Ballu .................. A01M 7/0089
10,112,586 B2 10/2018 Brooks et al.
10,369,585 B2 8/2019 Brooks et al.
10,485,229 B2 11/2019 Hammer et al.
10,606,303 B2 3/2020 Weigand
10,814,341 B2 10/2020 Brooks et al.
11,219,156 B2 * 1/2022 Davis ................... A01C 23/007
2006/0273189 A1 * 12/2006 Grimm .................. A01G 25/16 239/146
2012/0241533 A1 * 9/2012 Moeller .............. A01M 7/0089 239/1
2012/0267916 A1 * 10/2012 Ringer ................ A01M 7/0042 296/190.11
2015/0216118 A1 * 8/2015 Swinney ............. A01M 7/0053 239/159
2015/0367358 A1 * 12/2015 Funseth ................. A01G 25/16 239/562
2015/0375242 A1 * 12/2015 Haviland .................. E01H 3/02 239/69
2015/0375247 A1 * 12/2015 Funseth .................... B05B 1/20 239/69
2016/0178422 A1 * 6/2016 Humpal ................ A01M 7/006 239/71
2016/0309647 A1 * 10/2016 Bittner ................ A01M 7/0089
2016/0310978 A1 10/2016 Bittner et al.
2017/0006852 A1 * 1/2017 Engelbrecht ........ A01M 7/0089
2017/0013822 A1 * 1/2017 Sporrer ............... A01M 7/0075
2017/0325444 A1 * 11/2017 Crinklaw ............ A01M 7/0089
2018/0080193 A1 * 3/2018 Myers ...................... E02F 9/262
2018/0317372 A1 * 11/2018 Schleicher ........... A01B 79/005
2019/0090472 A1 * 3/2019 Crinklaw ............... G05D 1/223
2020/0047206 A1 * 2/2020 Dunkel .................. G01N 27/06
2021/0195886 A1 * 7/2021 Smith ................. A01M 7/0053
2021/0329905 A1 10/2021 Hloben
2022/0117214 A1 * 4/2022 Garner ................ A01M 9/0092
2022/0142043 A1 5/2022 Cook et al.
2022/0192174 A1 * 6/2022 Humpal .............. A01M 7/0042
2022/0232816 A1 * 7/2022 Vandike .............. A01M 9/0092
2022/0325774 A1 * 10/2022 Oberheide ........... A01C 23/008
2023/0292732 A1 * 9/2023 Moore ................ A01M 7/0089 239/146
2023/0417603 A1 * 12/2023 Li .......................... H04N 23/52

OTHER PUBLICATIONS

"User Manual for Danfoil PC-Spray Controller VI" Danfoil (55 pages) https://www.danfoil.dk/CustomerData/Files/Folders/12-2014-airboss/64_pc-spraycontroller-111214-sp-9500pc-um-danfoil-nk-v1-2.pdf "Goldacres Total Machine Control Operators Manual" Goldacres Australia's World Class Sprayers Jul. 8, 2014 (110 pages) https://www.goldacres.com.an/wp-content/uploads/files/GATMC%20GA8700120%20R1%20Operator%20Manual.pdf.

"How Does a John Deere 4730 Field Sprayer Work?" Millionaire Farmer Jun. 20, 2021 https://www.youtube.com/watch?v=gAx_mS5-3fo.

* cited by examiner

AGRICULTURAL SPRAYER WITH AUXILIARY OPERATION CONTROL

FIELD OF THE INVENTION

The present disclosure generally relates to agricultural sprayers and, more particularly, to agricultural sprayers with auxiliary operation control.

BACKGROUND OF THE INVENTION

Agricultural sprayers apply an agricultural fluid (e.g., a pesticide, a nutrient, and/or the like) onto a field across which the sprayer is traveling. As such, a typical sprayer includes a boom assembly on which a plurality of spaced apart nozzles is mounted. Each nozzle is, in turn, configured to dispense or otherwise spray the agricultural fluid onto the underlying plants (e.g., crops, weeds, etc.) and/or soil. In this respect, the sprayer includes an agricultural fluid pump and various valves to supply the agricultural fluid from a tank to the nozzles. Additionally, the sprayer may include other auxiliary systems having various pumps and valves, such as a purge system and a rinse system, that support the operation of the sprayer. These pumps and valves are, in turn, independently controlled by various operator input devices. While such agricultural sprayers work well, further improvements are needed.

Accordingly, an improved agricultural sprayer would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural sprayer. The agricultural sprayer includes a frame, a plurality of wheels coupled to the frame, and a hydrostatic drive system configured to rotationally drive at least some of the plurality of wheels, with the hydrostatic drive system including a hydrostatic pump. Furthermore, the agricultural sprayer includes a boom assembly supported on the frame, with the boom assembly extending in a lateral direction between a first end and a second end. Additionally, the agricultural sprayer includes a plurality of nozzles supported on the boom assembly and spaced apart from each other along the lateral direction, with the plurality of nozzles configured to dispense an agricultural fluid onto underlying plants or soil. Moreover, the agricultural sprayer includes an agricultural fluid supply system configured to supply the agricultural fluid to the plurality of nozzles, with the agricultural fluid supply system including a supply pump and a plurality of supply valves. In addition, the agricultural sprayer includes an operator input device configured to receive to an input indicative of halting auxiliary operation of the agricultural sprayer and a computing system communicatively coupled to the operator input device. In this respect, the computing system is configured to receive the input from the operator input device. Furthermore, upon receipt of the input, the computing system is configured to control an operation of the hydrostatic drive system and the agricultural fluid supply system such that the supply pump is halted, the plurality of supply valves is closed, and the hydrostatic pump is operating.

In another aspect, the present subject matter is directed to an agricultural sprayer. The agricultural sprayer includes a frame, a plurality of wheels coupled to the frame, and an engine supported on the frame. Moreover, the agricultural sprayer includes a hydrostatic drive system coupled to the engine such that the hydrostatic drive system is configured to rotationally drive at least some of the plurality of wheels, with the hydrostatic drive system including a hydrostatic pump. Furthermore, the agricultural sprayer includes a boom assembly supported on the frame, with the boom assembly extending in a lateral direction between a first end and a second end. Additionally, the agricultural sprayer includes a plurality of nozzles supported on the boom assembly and spaced apart from each other along the lateral direction, with the plurality of nozzles configured to dispense an agricultural fluid onto underlying plants or soil. Moreover, the agricultural sprayer includes an agricultural fluid supply system configured to supply the agricultural fluid to the plurality of nozzles, with the agricultural fluid supply system including a supply pump and a plurality of supply valves. In addition, the agricultural sprayer includes an operator input device configured to receive to an input indicative of halting auxiliary operation of the agricultural sprayer and a computing system communicatively coupled to the operator input device. In this respect, the computing system is configured to receive the input from the operator input device. Furthermore, upon receipt of the input, the computing system is configured to control an operation of the hydrostatic drive system and the agricultural fluid supply system such that the supply pump is halted, the plurality of supply valves is closed, and the hydrostatic pump is operating.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
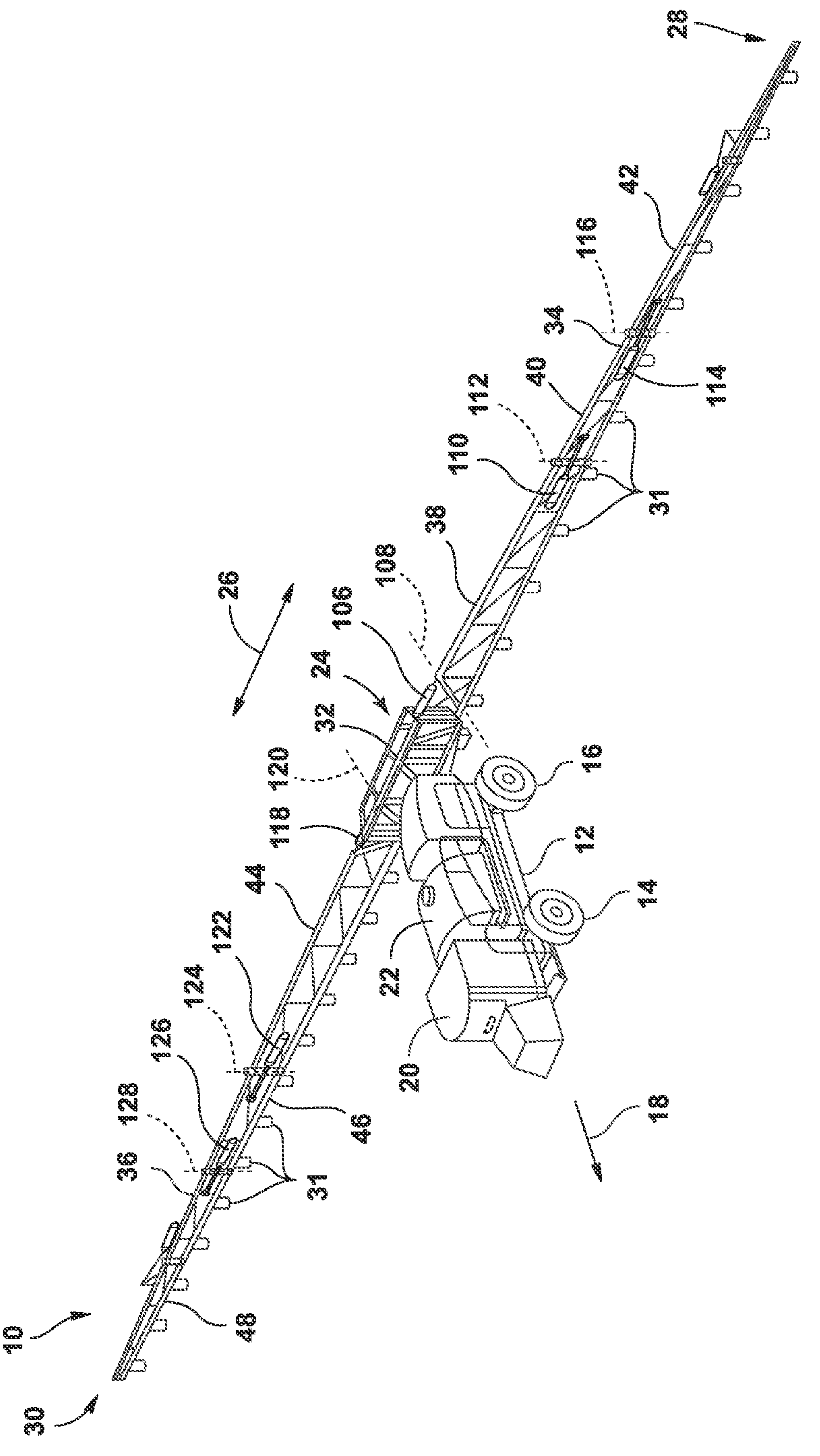
FIG. 1 illustrates a perspective view of one embodiment of an agricultural sprayer in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to an agricultural sprayer. As will be described below, the agricultural sprayer includes a hydrostatic drive system configured to rotationally drive at least some of the wheels of the sprayer. The hydrostatic drive system, in turn, includes a hydrostatic pump. Furthermore, the agricultural sprayer includes a plurality of nozzles supported on a boom assembly and configured to dispense an agricultural fluid onto underlying plants or soil. Additionally, the agricultural sprayer includes an agricultural fluid supply system configured to supply the agricultural fluid to the plurality of nozzles. In this respect, the agricultural fluid supply system includes a supply pump and a plurality of supply valves.

In several embodiments, the agricultural sprayer includes an operator input device. For example, the operator input device may be located within the cab of the agricultural sprayer, such as on a multi-function handle. As such, the operator input device is configured to receive an input from the operator indicative of halting auxiliary operation of the agricultural sprayer. Auxiliary operation of the sprayer refers to the operation of systems and components of the sprayer that are not necessary to propel the sprayer. In this respect, upon receipt of the input from the operator input device, a computing system is configured to control the operation of the hydrostatic drive system and the agricultural fluid supply system such that the supply pump is halted, the supply valves are closed, and the hydrostatic pump remains operating.

Halting auxiliary operation of the agricultural sprayer while maintaining operation of the hydrostatic drive system based on an input from a single operator input device improves the operation of the sprayer. In current agricultural sprayers, the various components of the agricultural fluid supply system and other auxiliary systems on the sprayer are controlled with individual input devices. Moreover, in current agricultural sprayers, the entire machine including the hydrostatic drive system can be shut down with a single operator input device. However, such a configuration can make it difficult to shut down particular systems or components that have failed. For example, when an agricultural fluid supply conduit fails on a current sprayer, the operator could quickly shut down the entire machine with the single operator input device. However, the operator would be unable to move the machine, which could be problematic in certain situations. Alternatively, the operator could try to individually shut down the failing component. However, the operator may not know which component is failing or be able to quickly find the appropriate input device for the failing component. With the disclosed agricultural sprayer, all auxiliary operation of the agricultural sprayer can be stopped with a single input device, without affecting the ability of the sprayer to move. Thus, the disclosed agricultural sprayer allows for quick, efficient, and safe shut-down of auxiliary operation, such as when a system or component has failed, while still permitting the sprayer to move.

Figure 2:
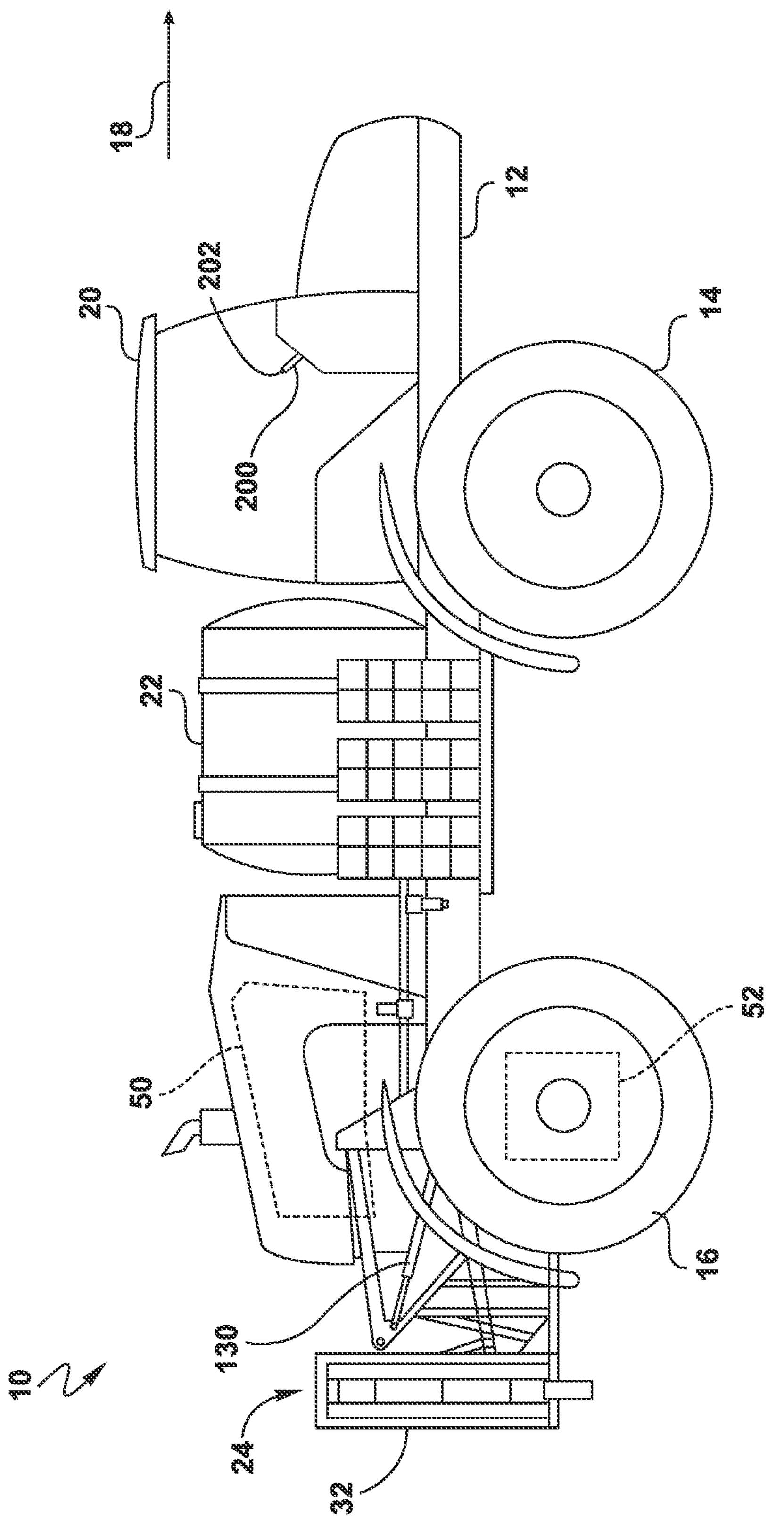
FIG. 2 illustrates a side view of the agricultural sprayer shown in FIG. 1.

Referring now to the drawings, FIGS. 1 and 2 illustrate differing views of one embodiment of an agricultural sprayer 10. Specifically, FIG. 1 illustrates a perspective view of the agricultural sprayer 10 and FIG. 2 illustrates a side view of the agricultural sprayer 10.

In the illustrated embodiment, the agricultural sprayer 10 is configured as a self-propelled agricultural sprayer. However, in alternative embodiments, the agricultural sprayer 10 may be configured as any other suitable agricultural vehicle that dispenses an agricultural fluid (e.g., a pesticide or a nutrient) while traveling across a field, such as an agricultural tractor and an associated towable sprayer.

As shown in FIGS. 1 and 2, the agricultural sprayer 10 includes a frame or chassis 12 configured to support or couple to a plurality of components. For example, a pair of steerable front wheels 14 and a pair of driven rear wheels 16 may be coupled to the frame 12. The wheels 14, 16 may be configured to support the agricultural sprayer 10 relative to the ground and move the sprayer 10 in the direction of travel 18 across the field. Furthermore, the frame 12 may support an operator's cab 20 in which one or more devices for controlling the agricultural sprayer 10 are located, such as a multi-function handle 200 having an operator input device 202 positioned thereon. Additionally, the frame 12 may support an agricultural product tank 22 configured to store or hold an agricultural fluid, such as a pesticide (e.g., a herbicide, an insecticide, a rodenticide, and/or the like), a fertilizer, or a nutrient. However, in alternative embodiments, the sprayer 10 may include any other suitable configuration. For example, in one embodiment, the front wheels 14 of the sprayer 10 may be driven in addition to or in lieu of the rear wheels 16.

Additionally, the sprayer 10 may include a boom assembly 24 supported on the frame 12. In general, the boom assembly 24 may extend in a lateral direction 26 between a first lateral end 28 and a second lateral end 30, with the lateral direction 26 extending perpendicular to the direction of travel 18. As will be described below, a plurality of nozzles 31 may be supported on the boom assembly 24 and spaced apart from each other along the lateral direction 26. The nozzles 31 are, in turn, configured to dispense the agricultural fluid stored in the tank 22 onto the underlying plants and/or soil as the agricultural sprayer 10 travels across the field in the direction of travel 18.

In several embodiments, the boom assembly 24 includes a plurality of boom sections. For example, in the illustrated embodiment, the boom assembly 24 includes a center section 32 and a pair of wing sections 34, 36. As shown in FIG. 1, a first wing section 34 extends outwardly in the lateral direction 26 from the center section 32 to the first lateral end 28. Similarly, a second wing section 36 extends outwardly in the lateral direction 26 from the center section 32 to the second lateral end 30. Moreover, in some embodiments, the boom sections may include a plurality of boom portions. For example, in the illustrated embodiment, the first wing section 34 includes a first portion 38 coupled to the center section 32, a second portion 40 coupled to the first portion 38, and a third portion 42 coupled to the second portion 40. Similarly, in the illustrated embodiment, the second wing section 36 includes a first portion 44 coupled to the center section 32, a second portion 46 coupled to the first portion 44, and a third portion 48 coupled to the second portion 46. However, in alternative embodiments, the boom assembly 24 may include any other suitable configuration.

Additionally, the agricultural sprayer 10 includes one or more actuators configured to move the boom assembly 24 (or a portion(s) thereof) relative to the frame 12. In this respect, the actuator(s) may be configured to move the boom assembly 24 between an unfolded position (e.g., as shown in FIG. 1) and a folded position (not shown). The boom assembly 24 may be moved to the unfolded position for performing spraying operations on a field. Conversely, the boom assembly 24 may be moved to the folded position for road travel and/or storage.

As shown in FIGS. 1 and 2, the agricultural sprayer 10 includes first, second, third, fourth, fifth, sixth, and seventh actuators 106, 110, 114, 118, 122, 126, 130. More specifically, as shown in FIG. 1, the first actuator 106 is coupled between the center section 32 and the first portion 38 of the first wing section 34 such that the first actuator 106 is configured to pivot the first wing section 34 relative to the center section 32 (and the frame 12) about a pivot axis 108. Furthermore, the second actuator 110 is coupled between the first and second portions 38, 40 of the first wing section 34 such that the second actuator 110 is configured to pivot the second portion 40 relative to the first portion 38 (and the frame 12) about a pivot axis 112. Additionally, the third actuator 114 is coupled between the second and third portions 40, 42 of the first wing section 34 such that the third actuator 114 is configured to pivot the third portion 42 relative to the second portion 40 (and the frame 12) about a pivot axis 116. Moreover, the fourth actuator 118 is coupled between the center section 32 and the first portion 44 of the second wing section 36 such that the fourth actuator 118 is configured to pivot the second wing section 36 relative to the center section 32 (and the frame 12) about a pivot axis 120. In addition, the fifth actuator 122 is coupled between the first and second portions 44, 46 of the second wing section 36 such that the fifth actuator 122 is configured to pivot the second portion 46 relative to the first portion 44 (and the frame 12) about a pivot axis 124. Furthermore, the sixth actuator 126 is coupled between the second and third portions 46, 48 of the second wing section 36 such that the sixth actuator 126 is configured to pivot the third portion 48 relative to the second portion 46 (and the frame 12) about a pivot axis 128. Additionally, as shown in FIG. 2, the seventh actuator 130 is coupled between the center section 32 and the frame 12 such that the seventh actuator 130 is configured to pivot the boom assembly 24 relative to the frame. However, in alternative embodiments, the agricultural sprayer 10 may include any other suitable actuators in addition to and/or in lieu of the actuators 106, 110, 114, 118, 122, 126, 130.

In addition, the actuators 106, 110, 114, 118, 122, 126, 130 may be configured as any suitable type of actuators. For example, in the illustrated embodiment, the actuators 106, 110, 114, 118, 122, 126, 130 are configured as fluid-driven cylinders, such as hydraulic or pneumatic cylinders. However, in alternative embodiments, the actuators 106, 110, 114, 118, 122, 126, 130 may be configured as any other suitable types of actuators, such as electric linear actuators.

Referring particularly to FIG. 2, the agricultural sprayer 10 may include one or more systems or components for propelling the sprayer 10 across the field in the direction of travel 18. Specifically, in several embodiments, the agricultural sprayer 10 may include an engine 50 and a hydrostatic drive unit 52 supported on the frame 12. The hydrostatic drive unit 52 may, in turn, be operably coupled to the engine 50 and may transmit the power generated by the engine 50 to the driven wheels 16. Thus, the engine 50 may be configured to rotatably drive at least some of the wheels of the sprayer 10.

Figure 3:
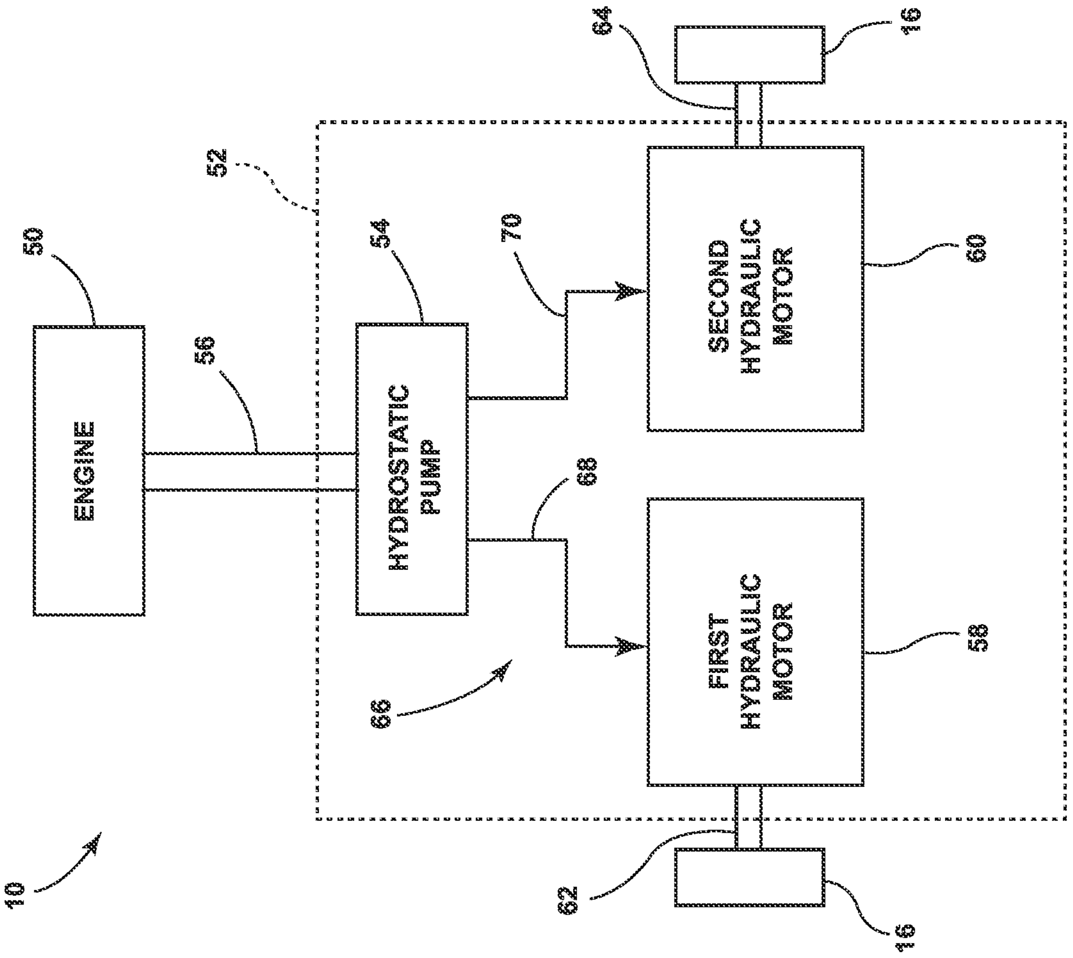
FIG. 3 illustrates a schematic view of one embodiment of a hydrostatic drive system for an agricultural sprayer in accordance with aspects of the present subject matter.

FIG. 3 illustrates a schematic view of the hydrostatic drive unit 52. Specifically, in several embodiments, the hydrostatic drive unit 52 may include a hydrostatic pump 54 configured to be rotationally driven by the engine 50, such as via a driveshaft 56. The hydrostatic drive unit 52 may also include first and second hydraulic motors 58, 60. As such, a first hydraulic motor 58 may be configured to rotationally drive one of the wheels 16 (e.g., via a first axle segment 62), while a second hydraulic motor 60 may be configured to rotationally drive the other of the wheels 16 (e.g., via a second axle segment 64). Moreover, the hydrostatic drive unit 52 may include a hydrostatic circuit 54. For example, in one embodiment, the hydrostatic circuit 66 may include a first fluid conduit 68 configured to fluidly couple the hydrostatic pump 54 to the first hydraulic motor 58 and a second fluid conduit 70 configured to fluidly couple the hydrostatic pump 54 to the second hydraulic motor 60.

As indicated above, the hydrostatic drive unit 52 may be configured to transmit power generated by the engine 50 to the wheels 16. More specifically, the engine 50 may be configured to combust or otherwise burn a mixture of air and fuel so as to rotationally drive the driveshaft 56. The driveshaft 56 may, in turn, rotationally drive the hydrostatic pump 54 in a manner that generates a pressurized flow of a fluid (e.g., hydraulic oil) within the hydrostatic circuit 66. In this regard, the first fluid conduit 68 may deliver a first portion of the pressurized fluid flow to the first hydraulic motor 58, thereby rotationally driving the first hydraulic motor 58 and the associated wheel 16. Similarly, the second fluid conduit 70 may deliver a second portion of the pressurized fluid flow to the second hydraulic motor 60, thereby rotationally driving the second hydraulic motor 60 and the associated wheel 16.

Figure 4:
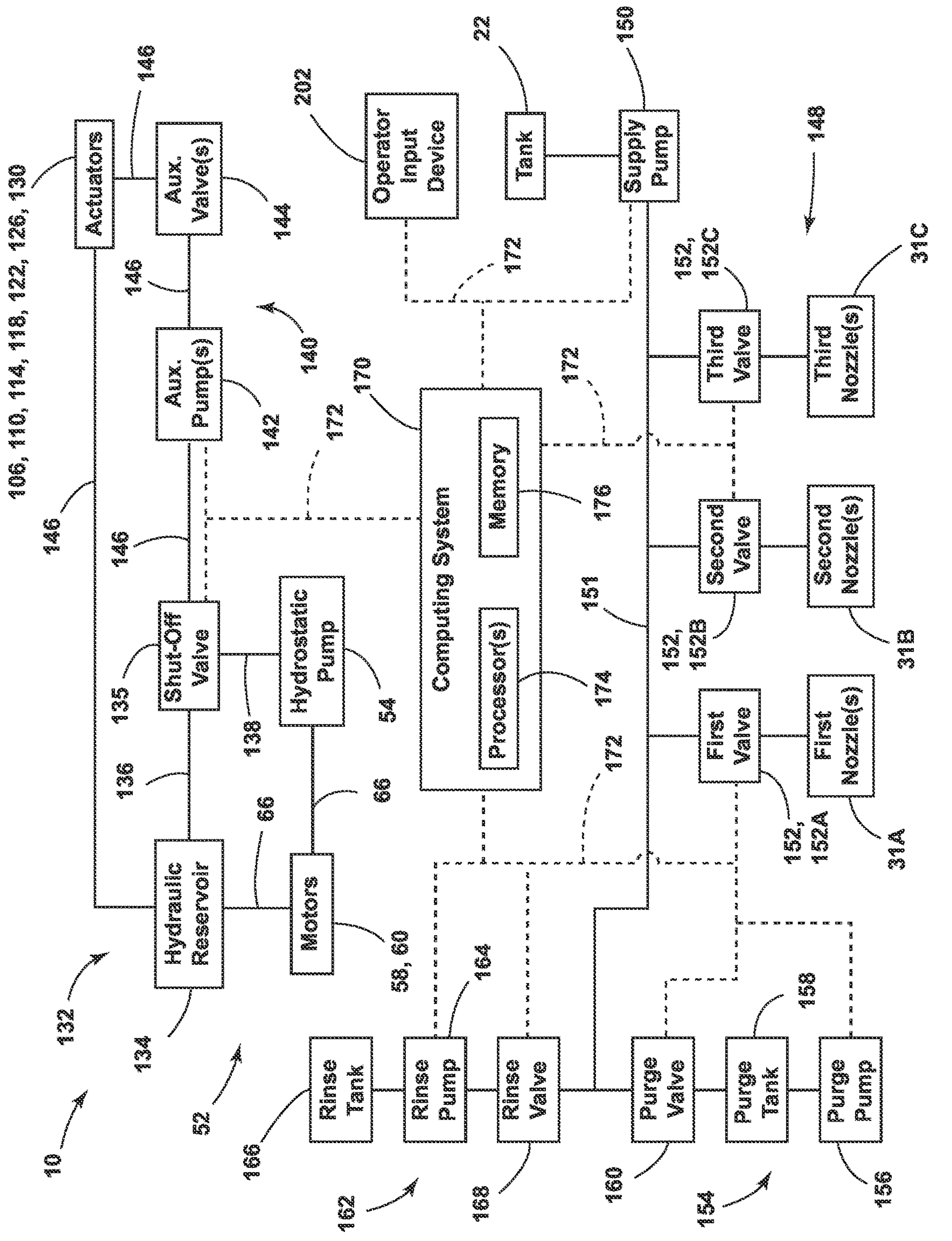
FIG. 4 illustrates a schematic view of one embodiment of the agricultural sprayer in accordance with aspects of the present subject matter, particularly illustrating various systems of the sprayer.

FIG. 4 illustrates a schematic view of one embodiment of the agricultural sprayer 10 in accordance with aspects of the present subject matter, particularly illustrating various fluid systems of the sprayer 10. As shown, the agricultural sprayer 10 includes a hydraulic system 132. In general, the hydraulic system 132 is configured to supply pressurized hydraulic fluid or oil to various components or systems of the sprayer 10. For example, the hydraulic system 132 includes a hydraulic reservoir 134 configured to store the hydraulic fluid. Furthermore, the hydraulic system 132 may include a main valve 135 fluidly coupled to the reservoir 134 via a hydraulic conduit 136. In this respect, the main valve 135 is configured to halt the flow of all hydraulic fluid from the reservoir 134. As such, when the main valve 135 is closed, all flow of hydraulic fluid through the hydraulic system 132 is halted.

Additionally, the hydraulic system 132 includes the hydrostatic drive system 52 of the sprayer 10. In this respect, the hydrostatic pump 54 may receive hydraulic fluid from the reservoir 134 via hydraulic conduits 136, 138. Thereafter, as described above, the hydrostatic pump 54 may supply a pressurized flow of hydraulic fluid to the hydraulic motors 58, 60 via the hydrostatic circuit 66, thereby driving the wheels 16 (FIGS. 1 and 2) and propelling the sprayer 10 across the field in the direction of travel 18. After the hydraulic fluid flows through the hydraulic motors 58, 60, the hydrostatic circuit 66 returns the hydraulic fluid to the reservoir 134.

Moreover, the hydraulic system 132 may include one more auxiliary hydraulic systems 140. In general, the auxiliary hydraulic system(s) 140 includes one or more auxiliary hydraulic pumps 142, one or more auxiliary hydraulic valves 144, one or more auxiliary hydraulic conduits 146 that are configured to supply hydraulic fluid to one or more auxiliary devices or components. An auxiliary device or component is, in turn, a device or component that is not necessary to propel the sprayer 10. Thus, the operation of auxiliary hydraulic components can be shut down or halted and the sprayer 10 can still be propelled across the field. For example, in the illustrated embodiment, the auxiliary hydraulic system 140 is configured to supply hydraulic fluid to the actuators 106, 110, 114, 118, 122, 126, 130. However, in alternative embodiments, the auxiliary hydraulic system 140 may be configured to supply hydraulic fluid to any other suitable devices or components that are not necessary to propel the sprayer 10 in addition to or in lieu of the actuators 106, 110, 114, 118, 122, 126, 130.

In addition, the agricultural sprayer 10 includes an agricultural fluid supply system 148. In general, the agricultural fluid supply system 148 is configured to supply the agricultural fluid stored in the tank 22 to the nozzles 31. In this respect, the agricultural fluid supply system 148 includes a supply pump 150 that is configured to pump the agricultural fluid from the tank 22 to the nozzles 31 via supply conduits 151. Additionally, the agricultural fluid supply system 148 includes one or more supply valves 152. The supply valve(s) 152 is, in turn, configured to selectively occlude the flow of the agricultural fluid from the supply pump 150 to the nozzles 31, thereby allowing the nozzles 31 to be turned on and off. For example, in the illustrated embodiment, the agricultural fluid supply system 148 includes a first supply valve 152A configured to control the flow of agricultural fluid to a first section or group of nozzles 31A, a second supply valve 152B configured to control the flow of agricultural fluid to a second section or group of nozzles 31B, and a third supply valve 152C configured to control the flow of agricultural fluid to a third section or group of nozzles 31C. However, in alternative embodiments, the agricultural fluid supply system 148 may include any other suitable number of supply valves 152.

As shown in FIG. 4, the agricultural sprayer 10 includes a purge system 154. In general, the purge system 154 is configured to supply purge air to the agricultural fluid supply system 148 to purge or otherwise remove residual agricultural fluid from the supply conduit 151 and the nozzles 31. As such, the purge system 154 includes a purge pump 156 configured to pressurize a purge tank 158 with purge air. A purge valve 160 is configured to control the release of the purge air from the purge tank 158. For example, when a purge operation is initiated, the purge valve 160 opens to release the purge air stored in the purge tank 158 into the supply conduits 151 to remove any residual agricultural fluid from the supply conduits 151 and the nozzles 31.

Furthermore, the agricultural sprayer 10 includes a rinse system 162. In general, the rinse system 162 is configured to supply rinse water or liquid to the agricultural fluid supply system 148 to rinse or otherwise remove residual agricultural fluid from the supply conduit 151 and the nozzles 31 after purging. As such, the rinse system 162 includes a rinse pump 164 configured to supply the rinse liquid from a rinse tank 166 to the supply conduits 151. A rinse valve 168 is configured to control the flow of the rinse liquid to the supply conduits 151. For example, when a rinse operation is initiated, the rinse pump 164 is activated and the rinse valve 168 opens to allow rinse liquid from the rinse tank 166 to flow into the supply conduits 151 to rinse any residual agricultural fluid from the supply conduits 151 and the nozzles 31.

In alternative embodiments, the agricultural sprayer 10 may include any other suitable fluid systems.

As mentioned above, the agricultural sprayer 10 includes the operator input device 202. In general, the operator input device 202 is configured to receive to an input from the operator that is indicative of halting auxiliary operation of the agricultural sprayer 10. Auxiliary operation of the sprayer, in turn, refers to the operation of systems and components of the sprayer that are not necessary to propel the sprayer (e.g., the agricultural fluid supply system 148, the purge system 154, the rinse system 162, the auxiliary hydraulic system(s) and associated auxiliary component(s), etc.). In this respect, and as will be described below, when the operator interacts with (e.g., flips, presses, etc.) the operator input device 202 in a manner that provides the input, auxiliary operation of the sprayer 10 is shut down or halted, while the engine 50 and the hydrostatic drive system 52 remains operating.

Figure 5:
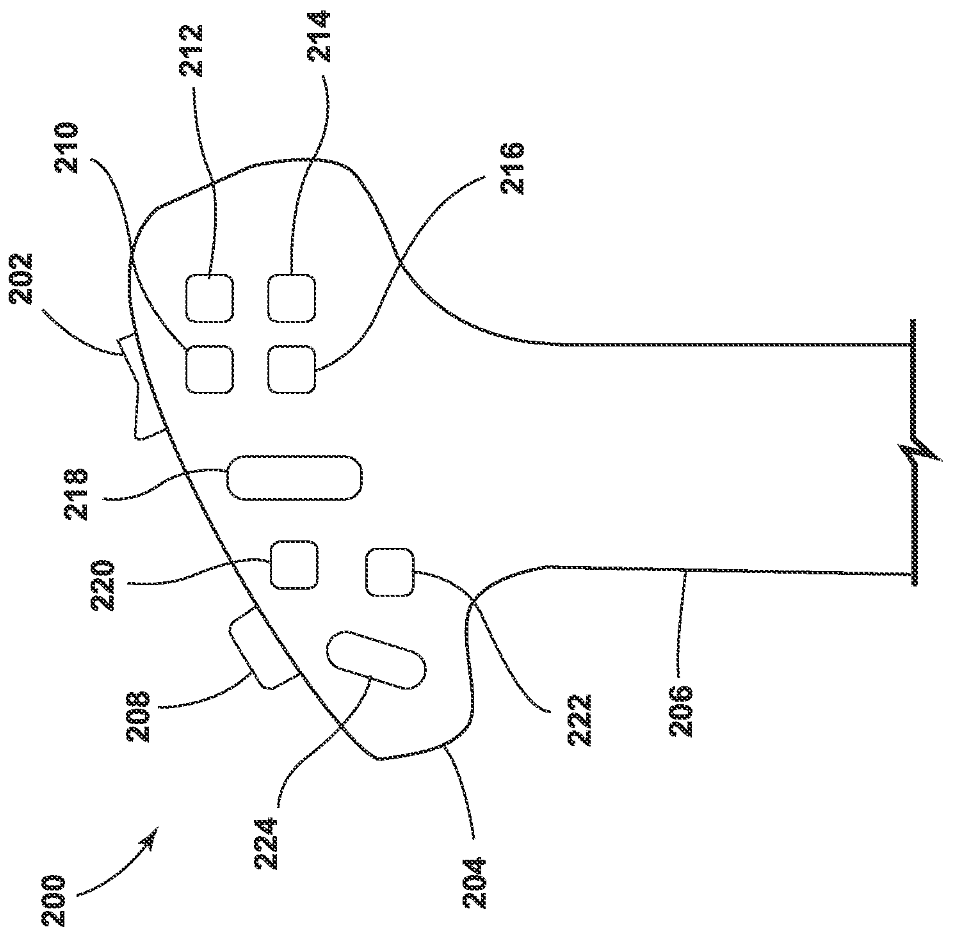
FIG. 5 is front view of one embodiment of a multifunction handle of an agricultural sprayer in accordance with aspects of the present subject matter.

The operator input device 202 may have suitable configuration and/or be positioned at any suitable location. For example, FIG. 5 illustrates a front view of the multi-purpose handle 200 positioned within the cab 20 of the sprayer 10. The multi-purpose handle 200 may, in turn, includes a grip portion 204 and a shaft 206 (e.g., may be joystick-like or lever-like) and may allow the operator to control several different functions of the sprayer 10. In this respect, and as shown, the multi-purpose handle 200 includes buttons 208, 210, 212, 214, 216, 218, 220, 222 and a scroll wheel 224, all of which may control different functions or operations of the sprayer 10. Additionally, as shown, the operator input device 202 may be configured as a switch (e.g., a rocker switch) positioned on the multi-purpose handle 200. However, in alternative embodiments, the operator input device 202 may be configured as any other suitable input device, such as a button, a toggle switch, a pedal, and/or the like. Additionally, the operator input device 202 may be positioned at any other suitable location.

Referring again to FIG. 4, the agricultural sprayer includes a computing system 170 communicatively coupled to one or more components of the agricultural sprayer 10 to allow the operation of such components to be electronically or automatically controlled by the computing system 170. For instance, the computing system 170 may be communicatively coupled to the operator input device 202 via a communicative link 172. As such, the computing system 170 may be configured to receive an input or data from the operator input device 202 that is indicative of whether the operator has provided an input to halt auxiliary operation of the agricultural sprayer 10. Furthermore, the computing system 170 may be communicatively coupled to the main valve 135; the auxiliary pump(s) 142; the auxiliary valve(s) 144; the supply pump 150; the first, second, and third supply valves 152A, 152B, 152C; the purge pump 156; the purge valve 160; the rinse pump 164; and the rinse valve 168 via the communicative link 172. In this respect, the computing system 170 may be configured to control the operation of such components. In addition, the computing system 170 may be communicatively coupled to any other suitable components of the agricultural sprayer 10.

In general, the computing system 170 may comprise one or more processor-based devices, such as a given controller or computing device or any suitable combination of controllers or computing devices. Thus, in several embodiments, the computing system 170 may include one or more processor(s) 174 and associated memory device(s) 176 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 176 of the computing system 170 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 176 may generally be configured to store suitable computer-readable instructions that, when implemented by the processor(s) 174, configure the computing system 170 to perform various computer-implemented functions, such as one or more aspects of the methods and algorithms that will be described herein. In addition, the computing system 170 may also include various other suitable components, such as a communications circuit or module, one or more input/output channels, a data/control bus and/or the like.

The various functions of the computing system 170 may be performed by a single processor-based device or may be distributed across any number of processor-based devices, in which instance such devices may be considered to form part of the computing system 170. For instance, the functions of the computing system 170 may be distributed across multiple application-specific controllers or computing devices, such as a navigation controller, an engine controller, a transmission controller, a spray controller, and/or the like.

Figure 6:
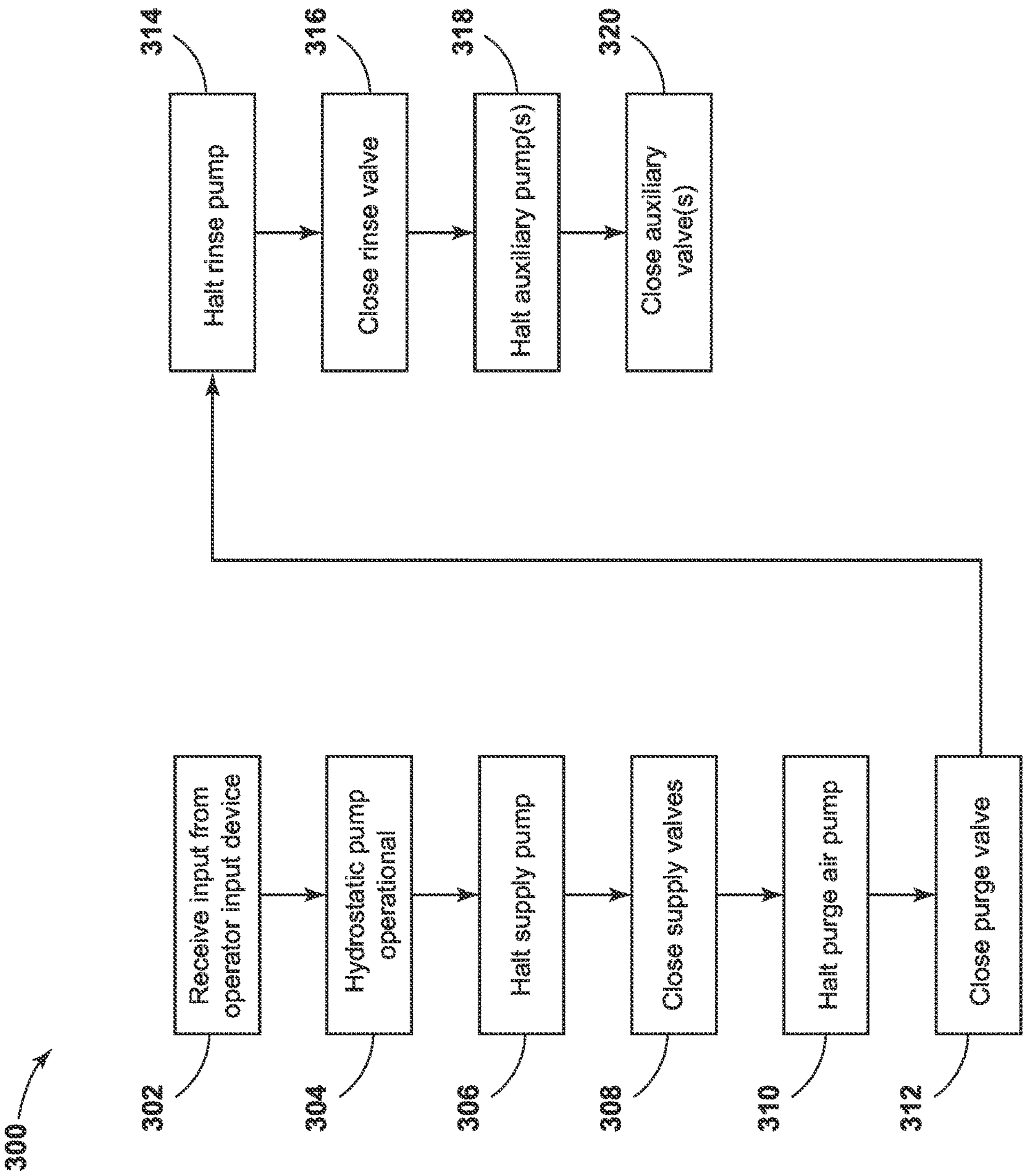
FIG. 6 illustrates a flow diagram providing one embodiment of control logic for controlling the operation of an agricultural sprayer in accordance with aspects of the present subject matter.

Referring now to FIG. 6, a flow diagram of one embodiment of example control logic 300 that may be executed by the computing system 170 (or any other suitable computing system) for controlling the operation of an agricultural sprayer is illustrated in accordance with aspects of the present subject matter. Specifically, the control logic 300 shown in FIG. 6 is representative of steps of one embodiment of an algorithm that can be executed to control the operation of an agricultural sprayer in a manner that allows for auxiliary operation of the sprayer to be halted with a single operator input, while maintaining the ability of the sprayer to move across the field.

As shown, at (302), the control logic 300 includes receiving an input from an operator input device of an agricultural sprayer. Specifically, as mentioned above, in several embodiments, the computing system 170 may be communicatively coupled to the operator input device 202 via the communicative link 172. In this respect, when it is desired to halt auxiliary operation of the sprayer 10 (e.g., when one of the supply conduits 151 has broken), the operator interacts with (e.g., flips, presses, etc.) the operator input device 202 in a manner that provides the input that auxiliary operation of the sprayer 10 is to be shut down or halted. Thereafter, the computing system 170 may receive an input or data indicating that auxiliary operation of the sprayer 10 is to be shut down or halted from the operator input device 202 via the communicative link 172.

Furthermore, at (304), the control logic 300 includes controlling the operation of a hydrostatic drive system of the agricultural sprayer such that a hydrostatic pump of the sprayer is operating. Specifically, as mentioned above, in several embodiments, the computing system 170 may be communicatively coupled to the main valve 135 via the communicative link 172. In this respect, upon receipt of the input at (202), the computing system 170 is configured to transmit control signals to the main valve 135 via the communicative link 172. The control signals, in turn, instruct the main valve 135 to remain open such that the hydrostatic pump 54 continues to operate, thereby allowing the sprayer 10 to be propelled or moved, as needed or desired.

Additionally, at (306), the control logic 300 includes controlling the operation of an agricultural fluid supply system of the agricultural sprayer such that a supply pump of the sprayer is halted. Specifically, as mentioned above, in several embodiments, the computing system 170 may be communicatively coupled to the supply pump 150 via the communicative link 172. In this respect, upon receipt of the input at (202), the computing system 170 is configured to transmit control signals to the main valve 135 via the communicative link 172. The control signals, in turn, instruct the supply pump 150 to halt operation such that pumping of the agricultural fluid from the tank 22 to the nozzles 31 ceases.

Moreover, at (308), the control logic 300 includes controlling the operation of the agricultural fluid supply system of the agricultural sprayer such that supply valves of the sprayer are closed. Specifically, as mentioned above, in several embodiments, the computing system 170 may be communicatively coupled to the first, second, and third supply valves 152A, 152B, 152C via the communicative link 172. In this respect, upon receipt of the input at (202), the computing system 170 is configured to transmit control signals to the first, second, and third supply valves 152A, 152B, 152C via the communicative link 172. The control signals, in turn, instruct the first, second, and third supply valves 152A, 152B, 152C to close such that the flow of the agricultural fluid from the supply pump 150 to the nozzles 31 ceases.

In addition, at (310), the control logic 300 includes controlling the operation of a purge system of the agricultural sprayer such that a purge air pump of the sprayer is halted. Specifically, as mentioned above, in several embodiments, the computing system 170 may be communicatively coupled to the purge air pump 156 via the communicative link 172. In this respect, upon receipt of the input at (202), the computing system 170 is configured to transmit control signals to the purge air pump 156 via the communicative link 172. The control signals, in turn, instruct the purge air pump 156 to halt operation such that additional generation of pressurized purge air is ceased.

As shown in FIG. 6, at (312), the control logic 300 includes controlling the operation of the purge system of the agricultural sprayer such that a purge valve of the sprayer is closed. Specifically, as mentioned above, in several embodiments, the computing system 170 may be communicatively coupled to the purge valve 160 via the communicative link 172. In this respect, upon receipt of the input at (202), the computing system 170 is configured to transmit control signals to the purge valve 160 via the communicative link 172. The control signals, in turn, instruct the purge valve 160 to close such that any purging of the supply conduits 151 and the nozzles 31 is ceased.

Furthermore, at (314), the control logic 300 includes controlling the operation of a rinse system of the agricultural sprayer such that a rinse pump of the sprayer is halted. Specifically, as mentioned above, in several embodiments, the computing system 170 may be communicatively coupled to the rinse pump 164 via the communicative link 172. In this respect, upon receipt of the input at (202), the computing system 170 is configured to transmit control signals to the rinse pump 164 via the communicative link 172. The control signals, in turn, instruct the rinse pump 164 to halt operation such that pumping of the rinse liquid from the rinse tank 166 ceases.

Additionally, at (316), the control logic 300 includes controlling the operation of the rinse system of the agricultural sprayer such that a rinse valve of the sprayer is closed. Specifically, as mentioned above, in several embodiments, the computing system 170 may be communicatively coupled to the rinse valve 168 via the communicative link 172. In this respect, upon receipt of the input at (202), the computing system 170 is configured to transmit control signals to the rinse valve 168 via the communicative link 172. The control signals, in turn, instruct the rinse valve 168 to close such that any rinsing of the supply conduits 151 and the nozzles 31 is ceased.

Moreover, at (318), the control logic 300 includes controlling the operation of an auxiliary hydraulic system of the agricultural sprayer such that an auxiliary pump of the sprayer is halted. Specifically, as mentioned above, in several embodiments, the computing system 170 may be communicatively coupled to the auxiliary pump(s) 142 via the communicative link 172. In this respect, upon receipt of the input at (202), the computing system 170 is configured to transmit control signals to the auxiliary pump(s) 142 via the communicative link 172. The control signals, in turn, instruct the auxiliary pump(s) 142 to halt operation such that pumping of hydraulic fluid to the auxiliary component(s) (e.g., the actuators 106, 110, 114, 118, 122, 126, 130) ceases.

In addition, at (320), the control logic 300 includes controlling the operation of the auxiliary hydraulic system of the agricultural sprayer such that an auxiliary valve of the sprayer is closed. Specifically, as mentioned above, in several embodiments, the computing system 170 may be communicatively coupled to the auxiliary valve(s) 144 via the communicative link 172. In this respect, upon receipt of the input at (202), the computing system 170 is configured to transmit control signals to the auxiliary valve(s) 144 via the communicative link 172. The control signals, in turn, instruct the auxiliary valve(s) 144 to close such that the flow of hydraulic fluid to the auxiliary component(s) (e.g., the actuators 106, 110, 114, 118, 122, 126, 130) ceases.

(306)-(320) are described above separately for purposes of clarity. However, in practice, (306)-(320) may be performed simultaneously or substantially simultaneously.

Furthermore, any other suitable auxiliary systems and/or components of the sprayer may be closed, halted, or otherwise shut down upon receipt to the input at (202).

It is to be understood that the steps of the control logic 300 are performed by the computing system 170 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 170 described herein, such as the control logic 300, is implemented in software code or instructions which are tangibly stored on a tangible computer readable medium. The computing system 170 loads the software code or instructions via a direct interface with the computer readable medium or via a wired and/or wireless network. Upon loading and executing such software code or instructions by the computing system 170, the computing system 170 may perform any of the functionality of the computing system 170 described herein, including any steps of the control logic 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural sprayer, comprising:

a frame;

a plurality of wheels coupled to the frame;

a hydrostatic drive system including a hydrostatic pump configured to rotationally drive at least some of the plurality of wheels;

a boom assembly supported on the frame, the boom assembly extending in a lateral direction between a first end and a second end;

an auxiliary actuator configured to move a first portion of the boom assembly relative to a second portion of the boom assembly;

an auxiliary pump configured to supply hydraulic fluid to the auxiliary actuator;

a plurality of nozzles supported on the boom assembly and spaced apart from each other along the lateral direction, the plurality of nozzles configured to dispense an agricultural fluid onto underlying plants or soil;

an agricultural fluid supply system configured to supply the agricultural fluid to the plurality of nozzles, the agricultural fluid supply system including a supply pump and a plurality of supply valves;

a purge valve configured to control a flow of purge air to the plurality of nozzles;

a purge air pump configured to generate the flow of purge air;

a rinse valve configured to control a flow of rinse liquid to the plurality of nozzles;

a rinse pump configured to generate the flow of the rinse liquid;

a switch that receives an input indicative of halting auxiliary operation of the agricultural sprayer; and a computing system communicatively coupled to the switch, wherein the computing system:

receives the input from the switch; and upon receipt of the input, controls an operation of the hydrostatic pump, the agricultural fluid supply system, the auxiliary pump, the purge valve, the purge air pump, the rinse valve, and the rinse pump such that the supply pump is halted, the plurality of supply valves is closed, the auxiliary pump is halted, the purge valve is closed, the purge air pump is halted, the rinse valve is closed, the rinse pump is halted, and the hydrostatic pump is operating.

2. The agricultural sprayer of claim 1, further comprising:
a cab supported on the frame,
wherein the switch is positioned within the cab.

3. The agricultural sprayer of claim 2, further comprising:
a multi-function handle positioned within the cab,
wherein the switch is positioned on the multi-function handle.

4. An agricultural sprayer, comprising:
a frame;
a plurality of wheels coupled to the frame;
an engine supported on the frame;
a hydrostatic drive system including a hydrostatic pump coupled to the engine such that the hydrostatic drive system is configured to rotationally drive at least some of the plurality of wheels;
a boom assembly supported on the frame, the boom assembly extending in a lateral direction between a first end and a second end;
a plurality of nozzles supported on the boom assembly and spaced apart from each other along the lateral direction, the plurality of nozzles configured to dispense an agricultural fluid onto underlying plants or soil;
an agricultural fluid supply system configured to supply the agricultural fluid to the plurality of nozzles, the agricultural fluid supply system including a supply pump and a plurality of supply valves;
a purge valve configured to control a flow of purge air to the plurality of nozzles;
a purge air pump configured to generate the flow of purge air;
a rinse valve configured to control a flow of rinse liquid to the plurality of nozzles;
a rinse pump configured to generate the flow of the rinse liquid;
an operator input device that receives an input indicative of halting auxiliary operation of the agricultural sprayer; and
a computing system communicatively coupled to the operator input device, wherein the computing system:
receives the input from the operator input device; and
upon receipt of the input, controls an operation of the hydrostatic pump, the agricultural fluid supply system, the purge valve, the purge air pump, the rinse valve, and the rinse pump such that the supply pump is halted, the plurality of supply valves is closed, the purge valve is closed, the purge air pump is halted, the rinse valve is closed, the rinse pump is halted, and the hydrostatic pump is operating.

5. The agricultural sprayer of claim 4, further comprising:
a cab supported on the frame,
wherein the operator input device is positioned within the cab.

6. The agricultural sprayer of claim 5, wherein the operator input device comprises a switch.

7. The agricultural sprayer of claim 6, further comprising:
a multi-function handle positioned within the cab,
wherein the operator input device is positioned on the multi-function handle.

* * * * *